(12) United States Patent
Paul et al.

(10) Patent No.: US 7,957,455 B2
(45) Date of Patent: Jun. 7, 2011

(54) METHOD AND CIRCUIT ARRANGEMENT FOR CALIBRATION OF A SAMPLING CONTROL SIGNAL WHICH INFLUENCES THE SAMPLING TIME OF A RECEIVED SIGNAL FROM A SAMPLING PHASE SELECTION ELEMENT

(75) Inventors: Steffen Paul, Baierbrunn (DE); Thomas Ruprich, München (DE); Dietmar Wenzel, München (DE)

(73) Assignee: Infineon Technologies AG, Neubiberg (DE)

( * ) Notice: Subject to any disclaimer, the term of this patent is extended or adjusted under 35 U.S.C. 154(b) by 2083 days.

(21) Appl. No.: 10/898,047

(22) Filed: Jul. 23, 2004

(65) Prior Publication Data

US 2005/0058184 A1 Mar. 17, 2005

(30) Foreign Application Priority Data

Jul. 25, 2003 (DE) .................. 103 34 064

(51) Int. Cl.
*H04B 1/00* (2006.01)

(52) U.S. Cl. .......... 375/148; 375/355; 708/313

(58) Field of Classification Search .......... 375/148, 375/355, 233, 267, 340; 370/342, 509; 455/255, 455/258, 260; 708/313
See application file for complete search history.

(56) References Cited

U.S. PATENT DOCUMENTS

| | | | | |
|---|---|---|---|---|
| 4,455,649 A | * | 6/1984 | Esteban et al. | 370/522 |
| 5,204,827 A | * | 4/1993 | Fujita et al. | 708/313 |
| 5,335,194 A | * | 8/1994 | Clayton et al. | 708/313 |
| 5,596,582 A | * | 1/1997 | Sato et al. | 370/509 |
| 5,694,434 A | * | 12/1997 | Burke | 375/340 |
| 5,943,369 A | * | 8/1999 | Knutson et al. | 375/326 |
| 5,999,564 A | * | 12/1999 | Dagdeviren | 375/222 |
| 6,239,730 B1 | * | 5/2001 | Wenger | 341/139 |
| 6,275,186 B1 | * | 8/2001 | Kong | 342/363 |
| 6,463,048 B1 | * | 10/2002 | Garyantes | 370/342 |
| 6,567,478 B2 | * | 5/2003 | Oishi et al. | 375/297 |
| 6,567,480 B1 | * | 5/2003 | Brardjanian et al. | 375/331 |
| 6,819,641 B1 | * | 11/2004 | Terao et al. | 369/47.16 |
| 6,873,648 B1 | * | 3/2005 | Atarius et al. | 375/147 |
| 7,145,945 B2 | * | 12/2006 | Modrie et al. | 375/233 |
| 2002/0034271 A1 | * | 3/2002 | Heller et al. | 375/350 |

(Continued)

FOREIGN PATENT DOCUMENTS

DE 100 05 441 A1 6/2001

OTHER PUBLICATIONS

Taub et al ("Principles of Communication Systems Second Edition", McGraw-Hill Publishing Company, 1986, p. 212).*

*Primary Examiner* — David C. Payne
*Assistant Examiner* — Leon-Viet Q Nguyen
(74) *Attorney, Agent, or Firm* — Eschweiler & Associates, LLC

(57) ABSTRACT

A discrete sampling control signal, which influences the sampling time, from a sampling phase selection element is calibrated by definition of quantization intervals for a sampling time error signal. For this purpose, a received signal is shifted through a series of time shifts $\tau_i$ in the signal path upstream of the sampling phase selection element. The sampling time errors $e_i$ associated with the respective time shifts $\tau_i$ are measured. The quantization steps of the sampling control signal that are suitable for the sampling phase selection element are then determined from the relationship obtained between $\tau_i$ and $e_i$.

22 Claims, 4 Drawing Sheets

U.S. PATENT DOCUMENTS

2002/0071509 A1* 6/2002 Richards et al. ............. 375/355
2003/0058963 A1* 3/2003 Cattaneo et al. ............. 375/316
2003/0128783 A1* 7/2003 Richards et al. ............. 375/355
2003/0186666 A1* 10/2003 Sindhushayana ............ 455/260
2005/0201503 A1* 9/2005 Denk et al. .................... 375/355
2005/0265430 A1* 12/2005 Ozluturk et al. ............. 375/145
2006/0160510 A1* 7/2006 Seppinen et al. ......... 455/232.1

* cited by examiner (PRIOR ART) FIG 1
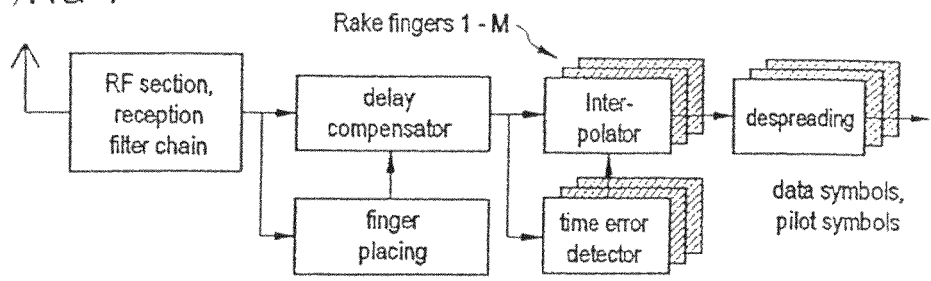
FIG 2
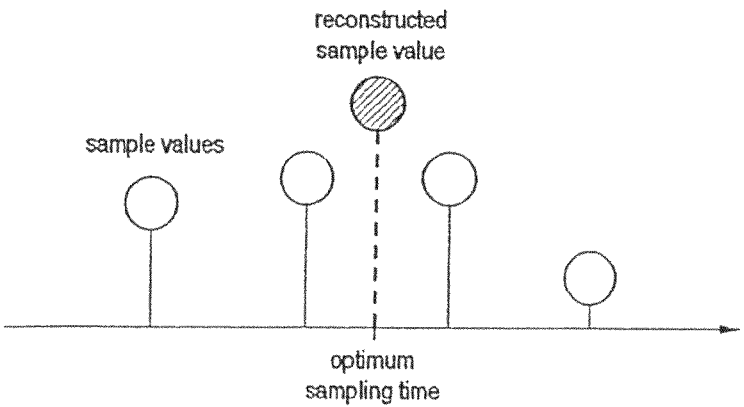
FIG 3
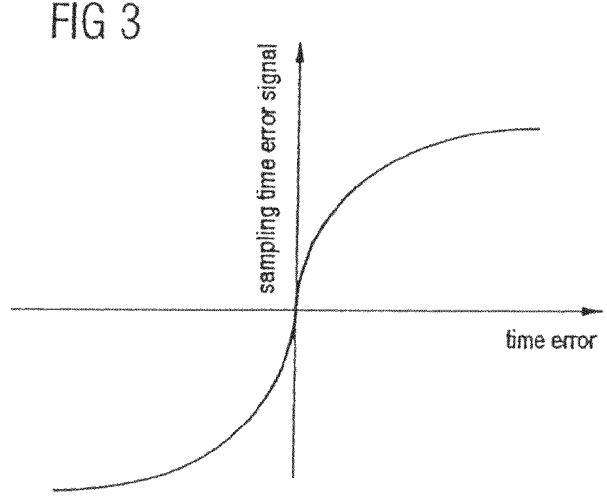

| path length | time error detector output | CPICH symbol | SINR measurement |
|---|---|---|---|
| $\tau_1$ | $e_1$ | $s_1$ | $snr_1$ |
| ... | ... | ... | ... |
| $\tau_N$ | $e_N$ | $s_N$ | $snr_N$ |

METHOD AND CIRCUIT ARRANGEMENT FOR CALIBRATION OF A SAMPLING CONTROL SIGNAL WHICH INFLUENCES THE SAMPLING TIME OF A RECEIVED SIGNAL FROM A SAMPLING PHASE SELECTION ELEMENT

REFERENCE TO RELATED APPLICATIONS

This application claims the benefit of the priority date of German application DE 103 34 064.5, filed on Jul. 25, 2003, the contents of which are herein incorporated by reference in their entirety.

FIELD OF THE INVENTION

The invention relates to a method and circuit arrangement for calibration of a sampling control signal, which influences the sampling time of a received signal in a mobile radio receiver, from a sampling phase selection element.

BACKGROUND OF THE INVENTION

Radio signals for mobile radio are subject to multipath propagation, that is to say reflections, scatter and diffraction of the transmitted radio signal on various obstructions in the propagation path results in generally two or more received signal versions in the receiver, which are shifted in time with respect to one another, and are attenuated to different extents. The functional principle of a RAKE receiver is based on first of all separately evaluating two or more of these received signal versions, and then superimposing them with the correct timing in order to achieve as high a detection gain as possible. The expression RAKE in this case provides an illustrative description of the structure of a receiver such as this, with the tines of the rake representing RAKE fingers, and the handle of the rake representing the higher-level received signal that is produced on the output side.

In UMTS systems (UMTS: universal mobile telecommunications system) for the third mobile radio generation, code division multiple access (CDMA) is used as the multiple access method. For CDMA, all of the subscribers use the same frequency range, but the radio signal is coded differently for or by each subscriber. The different CDMA coding allows subscriber separation.

During the CDMA coding process, each data symbol in the digital data signal to be transmitted has a subscriber-specific CDMA spreading code applied to it at the transmitter end. The elements of the CDMA spreading code sequence that is used for this purpose are referred to as chips. The time duration of a data symbol is an integer number Q of the chip time duration $T_c$, with $1/T_c$ corresponding to the chip rate. Q is the length (number of chips) in the CDMA spreading code sequence that is used.

CDMA despreading is carried out at the chip clock rate in the individual RAKE fingers. The chip time duration is known in the receiver, but it is necessary to determine and take account of the absolute timing of the chips of the received signal in each RAKE finger. This requires considerably more accuracy than the chip time duration $T_c$. In UMTS, the chip time duration is $T_c=2.6$ ms.

For this purpose, it is already known for each RAKE finger to have an associated circuit arrangement which samples the received signal with a high degree of oversampling (for example at 8 times the chip rate), with a different phase angle. An optimum sample value with an optimum phase angle is then selected separately in a sampling phase selection element for each RAKE finger on the basis of the maximum chip energy, and is then used for the rest of the signal processing.

Furthermore, German Laid-Open Specification DE 100 05 441 A 1 discloses a method in which a digital interpolator is used to select the optimum phase. Based on a data signal that is oversampled at twice the chip rate, this interpolator produces suitable intermediate values for intermediate sampling phases, which are then processed further in the RAKE finger at the chip clock rate.

The two implementation forms have the common feature that suitable phase angles of an oversampled data signal are selected in a sampling phase selection element for further processing.

The optimum sampling time of the received signal differs for each finger of the RAKE receiver, and is determined from the received symbols, in particular with the aid of the pilot symbols. The task of finding the optimum sampling time is carried out by a time error measurement device, which generally has a non-linear transmission characteristic between its sampling time error signal on the output side, from which the drive signal for the sampling phase selection element is generated, and the time error in the input side in the respective path of the RAKE finger. The actual time error in the respective path can be deduced from the output signal from the time error measurement device by reverse mapping.

The setting of the optimum sampling time by means of sampling phase selection is carried out with a restricted time resolution. For example, if interpolators according to the prior art are used as sampling phase selection elements, only up to three different intermediate values may be set. The interpolators can thus be implemented as digital filters with a small number of fixed filter coefficients. Owing to the fact that the time resolution of the sampling phase selection element is restricted, the sampling control signal that controls the sampling phase selection element is in discrete form. This necessitates an association between individual values of the discrete sampling control signal and individual quantization intervals of the sampling time error signal, whose values are continuous. This means that quantization intervals must be determined for the sampling time error signal in accordance with the requirements for the sampling phase selection element in the transmission characteristic of the time error measurement device, which indicates the relationship between the time error on the x axis and the sampling time error signal on the y axis. The transmission characteristic is referred to as an S curve, owing to its shape.

The shape of the S curve is governed on the one hand by the specific implementation of the time error measurement device, but on the other hand also by characteristics of the transmission path between the antenna and the input of the time error measurement device, in particular characteristics of the radio-frequency section and of the reception filter chain in the receiver. Furthermore, the characteristics of the transmission path between the antenna and the sampling phase selection element, in particular in the reception filter chain, but also between the time error measurement device and the sampling phase selection element, or characteristics of the implementation of the time error detector or of the sampling phase selection element, can result in shifts with respect to the origin of the S curve.

Until now, the quantization intervals for the S curve have typically been determined by means of a simulation model of the receiver, and are implemented permanently in the receiver. This has the disadvantage that quantization quality that results from this, and the resolution that is associated with this depend on the accuracy of the modelling of the reception path. Furthermore, component-dependent variations are possible inter alia with regard to the delay in the reception path, in the time error measurement device or in the sampling phase selection element, and these are not taken into account by the simulation model. In addition, temperature influences and ageing influences in the receiver cannot be covered by the simulation model, either. This means that the optimum sampling time is not always correctly set by the sampling phase selection element.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention comprises a method and a circuit arrangement, by means of which the optimum sampling time in a sampling phase selection element is defined sufficiently accurately. In particular, the aim is to make it possible to take account of system parameters, component scatters, ageing effects and temperature influences.

Accordingly, the discrete sampling control signal that drives the sampling phase selection element is calibrated by definition of the quantization intervals for a sampling time error signal.

For this purpose, a received signal s is shifted through a series of time shifts $\tau_i$ in the signal path upstream of the sampling phase selection element. The measured values $e_i$ of the sampling time error signal that are associated with the respective time shifts $\tau_i$ are determined. The quantization intervals for the sampling time error signal that are suitable for the sampling phase selection element are then determined from the relationship obtained between $\tau_i$ and $e_i$.

The relationship, which is determined by measurement, between the respective time shift $\tau_i$ of the received signal and the sampling time error $e_i$ measured in the time error measurement device allows quantization intervals to be defined such that they are optimally matched to the actual conditions in the receiver. The optimum sampling time can thus be driven, taking into account the totality of all the specific parameters, such as system parameters, component scattering, ageing effects and temperature influences. There is no need to model the system and the environment, which always results only in a simplified simulation of reality.

The received signal is preferably shifted in time through the series of time shifts $\tau_i$ within the mobile radio receiver. This makes it possible to carry out the calibration process in a simple manner, and possibly without any external test equipment, and thus cost-effectively.

First of all, an optimum sampling time $\tau_{i\_opt}$ is determined from the time shifts $\tau_i$ in order to determine the quantization steps for the sampling control signal. The quantization intervals are then determined for those discrete time shifts which can be associated with $\tau_{i\_opt}$ and to which the sampling phase selection element can be set. This is done by evaluation of the measured values between each of the predetermined time shifts. In this case, a first advantageous embodiment of the invention is characterized in that the optimum sampling time $\tau_{i\_opt}$ is determined in such a way that the minimum value $e_{i\ min}$ of the measured values $e_i$ is first of all determined, and the optimum sampling time $\tau_{i\_opt}$ is then defined as the time shift $\tau_{i\ min}$ associated with the minimum measured value $e_{i\ min}$. Provided that the reception signal path does not have any offset, that is to say the time error detector produces a measured value of magnitude zero at the optimum sampling time, this method allows the optimum sampling time $\tau_{i\_opt}$ to be determined precisely.

A further preferred embodiment of the invention provides for any possible shift in the S curve to be taken into account by an offset value with respect to the time error detector output. This means that the time error detector output incorrectly generates a measured value shifted through an offset value rather than the measured value e=0 at the optimum sampling time. In this case, the method as described above would result in a control point (zero crossing) for the S curve on the time axis which did not correspond to the optimum sampling time. In the case where the time error detector output has an offset value, the method according to the invention provides for the optimum sampling time $\tau_{i\_opt}$ being determined by detecting a pilot signal, which is contained in the received signal and is known at the receiver end, for the different time shifts $\tau_i$. The optimum sampling time $\tau_{i\_opt}$ is defined as that time shift $\tau_{i\ max}$ for which the pilot signal is detected with the maximum magnitude.

Furthermore, SINR (signal-to-interference plus noise ratio) measurements may preferably be carried out, and are additionally used for detection of the pilot signals during the process of determining the optimum sampling time.

According to a further preferred embodiment, provision is made for the sampling phase selection element to carry out the selection of the sampling phase by means of an interpolation of the received signal at suitable intermediate time values as a function of the discrete sampling control signal. It is advantageous that the interpolative production of suitable data signal intermediate values for selection of specific sample phases can be carried out with less effort than in the selection of specific sample data from an oversampled data signal using a high sampling rate.

A signal source with a fixed signal delay time is preferably used for the calibration process. Accordingly, for calibration by means of the time shifting element that is provided in the receiver, there is no need to shift the timing of the signal that is emitted from the signal source, so that the signal source can be designed to be simple, and the calibration process can be carried out autonomously in the receiver.

Furthermore, one preferred embodiment provides for the mobile radio receiver to be calibrated two or more times during the time period in which it is in use, in particular also automatically without any action by the user.

BRIEF DESCRIPTION OF THE DRAWINGS

The invention will be explained in more detail in the following text using an exemplary embodiment and with reference to the drawings, in which:

FIG. 1 shows an outline circuit diagram of a RAKE receiver in a digital mobile radio system;

FIG. 2 shows an illustration of the principle of interpolation of sample values in order to determine a specific sample value at an optimum sampling time;

FIG. 3 shows an illustration of the relationship between time errors and the sampling time error signal in a time error measurement device (S curve);

DETAILED DESCRIPTION OF THE INVENTION

FIG. 1 shows the outline circuit diagram of a RAKE receiver in a digital mobile radio system. The received signal first of all passes through the RF section of the receiver and a reception filter chain. After this, the output signal in the reception filter chain is processed further in a delay compensator and in the finger-placing unit, which drives the delay compensator. The output signal from the delay compensator feeds the interpolators which are located in each of the total of M RAKE fingers, and the time error detectors which are associated with them and each operate as a time error measurement device, with the output of a time error detector driving the respective interpolator. The output signal from each interpolator is then converted by means of a despreading unit to received symbols.

The optimum sampling time for the received signal is determined individually in the time error detector for each of the M fingers of the RAKE receiver from the correlation between the pilot symbols which are contained in the received signal and the pilot symbols which are stored in the receiver. This is typically implemented in the form of an early/late correlator. The data values relating to the optimum sampling time are produced "retrospectively" by computational means in the interpolator. The interpolator reconstructs data sampled at the optimum sampling time from the received data, which is oversampled for example at twice the chip rate, as a function of the output signal from the time error detector. The two units for finger placing and delay compensation ensure that all of the reception paths are processed synchronously in the various RAKE fingers. The RF section and the reception filter chain carry out demodulation and signal equalization.

FIG. 2 shows the principle of interpolation of sample values in order to determine the sample value for a specific sampling time. In this case, a sample value with a different phase angle is reconstructed from an oversampled input signal with two or more sample values per chip period. The reconstructed sample value is intended to be determined for an optimum sampling time that has a maximum chip energy and allows optimum detection of the received signal in the detector. The digital interpolator which is used for interpolation may, for example, be in the form of a square-law or cube-law Lagrange interpolator.

FIG. 3 shows an illustration of the relationship between the time error of the sampling process as an input variable, and the sampling time error signal as an output variable from the time error detector. The S curve that is illustrated here is highly non-linear and flattens out for time errors of large magnitude.

Figure 4:
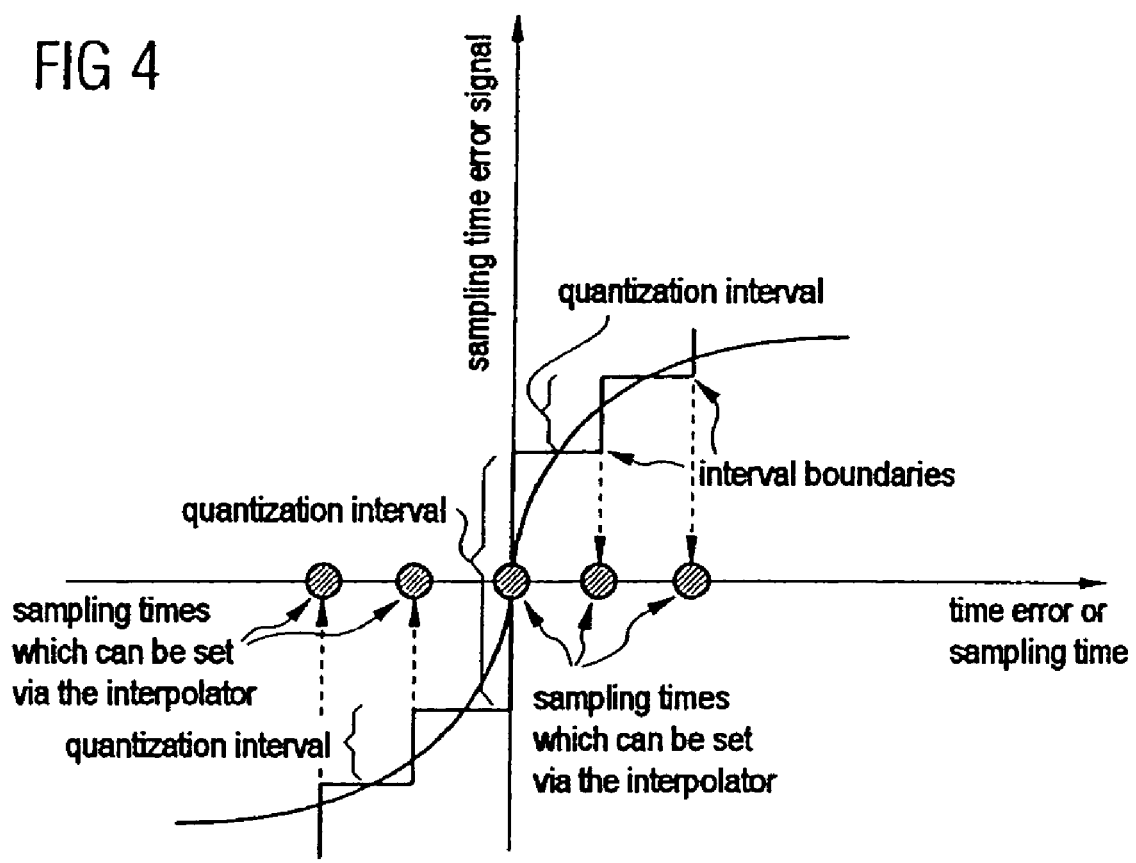
FIG. 4 shows an illustration of the S curve with superimposed association of quantization intervals for the sampling time error signal at specific sampling times, which can be set by means of the interpolator.

FIG. 4 shows the S curve which associates with a specific value of the sampling time error signal (y axis) to a time error (x axis). Furthermore, the same diagram shows typical quantization in the S curve as required owing to the resolution of the interpolator. Individual quantization intervals, defined by their interval boundaries, of the sampling time error signal (y axis) are in this case associated with specific, discrete sampling times (x axis), which can be set by means of the interpolator and can be selected by means of the discrete sampling control signal from the interpolator. For example, the time resolution of the variable sampling times may be Tc/8. This results in an association between a specific quantization interval of the sampling time error signal and a specific value of the discrete sampling control signal.

Figures 5, 6:
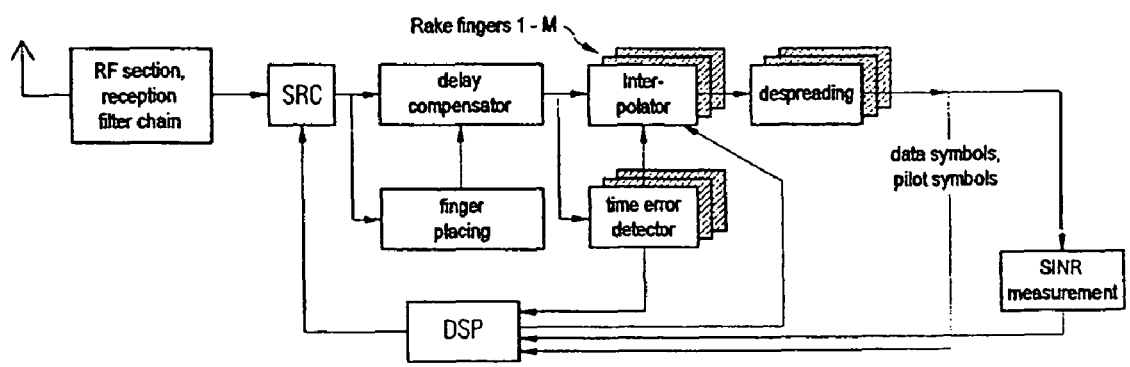
FIG. 5 shows a block diagram of the RAKE receiver with an apparatus for calibration of the quantization steps according to the invention.
FIG. 6 shows a measurement table relating to the calibration of the quantization steps.

FIG. 5 shows a block diagram of the RAKE receiver with the circuit arrangement according to the invention for calibration of the quantization intervals with the S curve being determined by measurement. In comparison to FIG. 1, the RAKE receiver shown in FIG. 5 has the following additional functional units:

a further interpolator or sampling rate converter (SRC) which is located upstream of the delay compensation;

a digital signal processor (DSP), which drives the SRC and the interpolator, which is driven by the time error detector, by the despreading unit and by an SINR measurement unit;

the SINR measurement unit, which is driven by the despreading unit and whose output is passed to the DSP.

The association between a specific interval of the sampling time error signal as the output signal from the time error detector and a discrete value of a sampling control signal as the controlling input signal for the interpolator is in this case produced by means of a functional unit between the time error detector and the interpolator, which is not shown here or in FIG. 1. Alternatively, it would also be feasible for the time error detector or the interpolator to carry out this association process.

According to the invention, the reception path must be shifted in time in the baseband chip in order to calibrate the interpolator. In the exemplary embodiment, this task is carried out in the SRC. Since, in many cases, the SRC is included in the baseband signal processing in any case, in order to compensate for inaccuracies in the sampling frequency—in this case twice the chip rate 2/Tc—the SRC can additionally also advantageously be used for the calibration method according to the invention. This is done by using the characteristic of an interpolator such as this so that the signal can be emitted with a variable time delay by using a suitable interpolation process to calculate a time-offset phase of the signal, also referred to as a polyphase. This may be done in a highly advantageous manner for the exemplary embodiment by means of a fine step width of 1 nanosecond, which is predetermined by the DSP.

The despread signals which occur with the step-by-step time shift are measured by the DSP, and their magnitudes are evaluated. Furthermore, the DSP controls the measurement procedure. Since the DSP is normally provided in any case in a baseband chip, all that is necessary is to provide a suitable control and measurement algorithm.

In addition to the determination of the optimum sampling time, signal-to-noise measurements can be carried out by means of the SINR measurement unit. The lower the noise level, the better the optimum sampling time is determined (assuming equivalent conditions).

FIG. 6 shows the measurement table for calibration of the quantization intervals, on the basis of which the measurement task can be described: first of all, a transmission signal must be provided for the receiver, with the distance between the transmitter and the receiver being kept constant. This signal may, for example, be provided by a base station, or a factory calibration by means of an emulator or, possibly, also by means of an emulator located in the receiver.

The measured value $e_i$ which is emitted at the output of the time error detector for each time delay $\tau_i$, i=1, . . . , N, the magnitude of the associated CPICH symbol $s_i$ and the associated measured value $snr_i$ obtained from SINR measurement are defined in the table. CPICH (common pilot channel) denotes the common pilot channel which is provided in the UMTS Standard and via which known symbols (pilot symbols) are transmitted to all the mobile radio receivers.

The following steps (so-called basic object of the measurement) are carried out during the measurement procedure in accordance with one aspect of the invention:
- the interpolation function in the interpolator is deactivated, so that all that is done is to half the sampling rate;
- the sampling rate converter SRC sets a path delay or time shift $\tau_i=1$;
- the output signal $e_i=1$ from the time error detector is measured and stored;
- the coefficient $s_i=1$ for the correlation of the received symbols with the symbols which are stored in the receiver is measured and stored, with the received signal which contains the pilot symbols (CPICH code) being despread by means of a correlator using the CPICH code and, downstream from a so-called integrate and dump functional unit (not illustrated), the magnitude or square is formed;
- the SINR values $snr_i=1$ are measured and stored; and
- the basic task is repeated a number of times for i=2, ..., N, and the results are averaged.

This basic task is thus carried out for N different path delays, that is to say for N different delays $\tau_i$ set by the SRC. The time resolution of these delays $\tau_i$ must be sufficiently high (for example 1 nanosecond) in order to make it possible to measure the S curve sufficiently accurately. Furthermore, the entire time interval $|t_1-t_N|$ which is covered must cover at least the interval between the adjacent sampling times of the oversampled signal.

Figure 7:
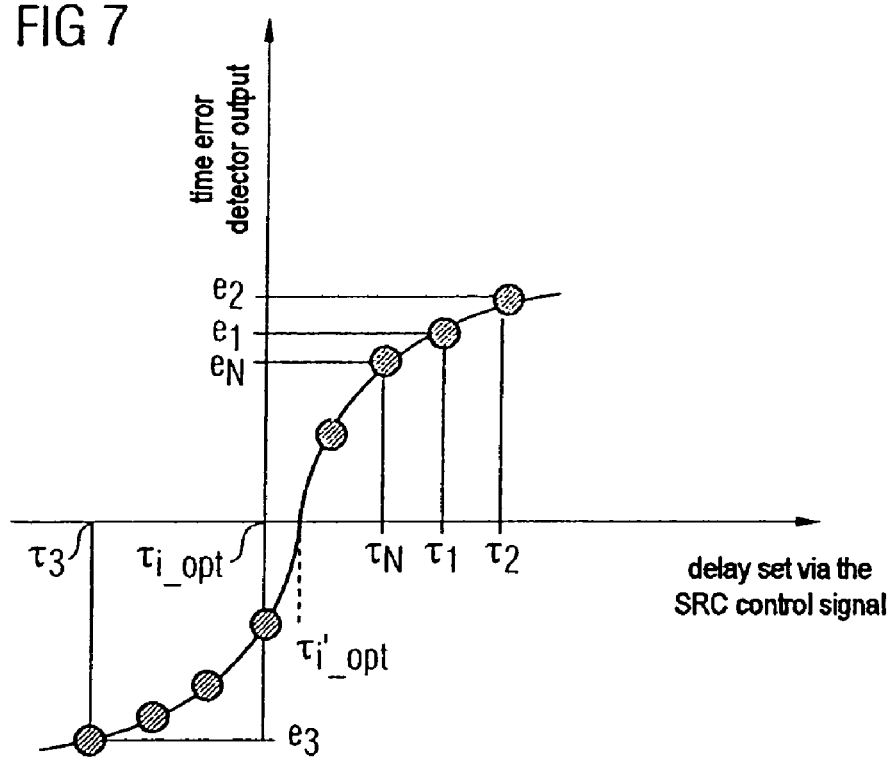
FIG. 7 shows an illustration in order to explain how the S curve is determined using the calibration method according to the method.

FIG. 7 shows the determination of the S curve with aid of the calibration method according to the invention. Each delay $\tau_i$ that is set by the SRC (the delays are illustrated with respect to one chip time period) is associated with an output value $e_i$ from the time error detector as the sampling time error signal (the time interval between successive delays or measurement times $\tau_i$ is illustrated greatly enlarged in FIG. 7). When carrying out the basic task for the various delay times $\tau_i$, where $\tau_i<\tau_j$ for i<j, the S curve is not determined monotonally, as can be seen from the measured values ($\tau_i$, $e_i$), i=1, 2, 3 in FIG. 7. This is because the transmitter and the receiver are not synchronized, so that the timing of the S curve as a function of the delays $\tau_i$ set via the SRC is not known. All that is known is the time difference between the delays $\tau_i$ which are set via the SRC. This means that the first measurement with $t_1$ is carried out at an undefined point on the S curve between two sampling times of the oversampled received signal, so that the location of the zero point on the S curve still has to be determined.

There are two possible ways to determine the absolute position of the S curve from the measured values:
1. The value $e_{i\ min}$ with the minimum magnitude is determined from the results of the output signal from the time error detector $e_i$. This value represents the approximate zero crossing of the output signal from the time error detector. If the output signal from the time error detector has no offset, $\tau_{i\ min}$ ideally represents the optimum sampling time $\tau i\_opt$, because the interpolator in the RAKE finger under consideration just halves the sampling rate and does not carry out any interpolation driven by means of the time error detector output signal. The curve that is determined for the calibration measurement in the form of the measurement points ($\tau_i$, $e_i$) must therefore be shifted in order to determine the S curve, such that $\tau_{i\ min}$ defines the origin of the shifted curve.

2. As already mentioned, since the behaviour of the reception filter chain is not ideal, it is possible that the S curve will not run through the origin of the coordinate system. This situation is illustrated in FIG. 7. In this case, no zero signal is produced by the time error detector at the optimum sampling time $\tau_{i\_opt}$ (that is to say at the origin of the S curve). Determination of the optimum sampling time using the method described above would in this case result in an optimum sampling time $\tau_{i\_opt}'$ which did not correspond to the actual optimum sampling time $\tau_{i\_opt}$. In order nevertheless to make it possible to define the optimum sampling time $\tau_{i\_opt}$, that value $s_i$ max from the results of the detection of the pilot or CPICH symbols $s_i$ is determined for which the pilot signal is detected with the maximum magnitude. The time shift $\tau_{i\ max}$ that is associated with this value $s_{i\ max}$ is used as the measured value for the optimum sampling time. The S curve is then obtained by shifting the experimentally determined measurement curve (measurement points ($\tau_i$; $e_i$)) in such a way that $\tau_{i\ max}=\tau_{i\_opt}$ defines the zero point of the shifted S curve.

The described steps mean that the profile and the position of the S curve in the coordinate system are known.

On the basis of the time resolution of the interpolator in the RAKE finger, it is now possible to define the optimum quantization intervals for the circuit structure.

Figure 8:
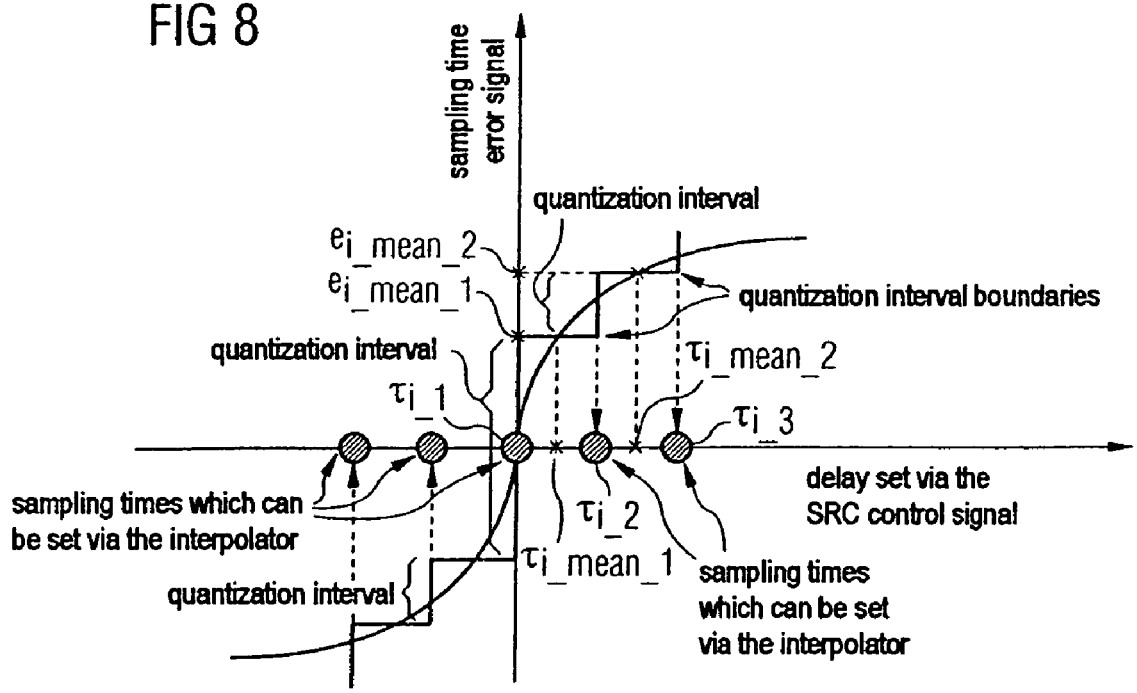
FIG. 8 shows an illustration in order to explain how quantization intervals are determined using the calibration method according to the invention.

FIG. 8 shows the process for determining the quantization intervals (ignoring the shift in the S curve), which is subdivided as follows:
1. Those shifts $\tau_{i\ 1}, \tau_{i\ 2}, \ldots, \tau_{i\ K}$ to which the interpolator in the RAKE fingers can be set, if possible, exactly, otherwise approximately, are searched for from the measurements, taking into account the previously determined absolute position of the S curve in the coordinate system. For example, K=5 settings of the interpolator may be possible.
2. The mean values $\tau_{i\ mean\ k}$ between intervals which result from adjacent setting points $\tau_{i\ k}, \tau_{i\ k+1}$, k=1, ..., K−1 are then in each case determined. The associated measured value $e_{i\ mean\ k}$ of the output signal from the time error detector then corresponds to the first interval boundary of the respective quantization interval. The second interval boundary of the respective quantization interval coincides with the first interval boundary $e_{i\ mean\ k+1}$ of the adjacent quantization interval. In this case, each interval is associated with one, and only one, discrete control signal value of the interpolator.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for calibration of a discrete sampling control signal that influences a sampling time of a received signal in a mobile radio receiver, from a sampling phase selection element by definition of quantization intervals for a sampling time error signal, wherein each quantization interval is allocated a predetermined value of the discrete sampling control signal, comprising in the mobile radio receiver:

a) shifting a received signal in the signal path upstream of the sampling phase selection element through a series of time shifts $\tau_i$;
b) measuring values $e_i$ of the sampling time error signal that are associated with the respective time shifts $\tau_i$; and
c) determining the quantization intervals of the sampling time error signal using the time shifts $\tau_i$ and the measured values $e_i$ obtained in act b).

2. The method of claim 1, wherein shifting the received signal through the series of time shifts $\tau_i$ is performed in a signal path within the mobile radio receiver.

3. The method of claim 1, further comprising determining an SINR value associated with the time shift is determined for each time shift $\tau_i$ by means of an SINR measurement.

4. The method of claim 1, wherein the sampling phase selection element is configured to perform an interpolation process on the received signal as a function of the discrete sampling control signal.

5. The method of claim 1, wherein a signal source for the received signal is set to a fixed signal delay time in order to carry out the calibration process.

6. The method of claim 1, wherein the calibration process is performed only once.

7. The method of claim 1, wherein the calibration process is performed two or more times during a time period in which the mobile radio receiver is in use.

8. The method of claim 1, wherein the time shifts of the series of time shifts $\tau_i$ are predetermined time shifts.

9. A circuit arrangement for calibration of a discrete sampling control signal that influences a sampling time of a received signal in a mobile radio-receiver, from a sampling phase selection element by definition of quantization intervals for a sampling time error signal, wherein each quantization interval is allocated a predetermined value of the discrete sampling control signal, comprising in the mobile radio receiver:
a time shifting element in a signal path upstream of the sampling phase selection element, and configured to delay a received signal through a series of time shifts $\tau_i$,
a time error measurement device configured to measure a sampling time error signal $e_i$, for each of the time shifts $\tau_i$; and
an evaluation device configured to calculate the quantization intervals of the sampling time error signal using the measured sampling time error signals $e_i$ and the series of time shifts $\tau_i$.

10. The circuit arrangement of claim 9, wherein the sampling phase control element comprises an interpolator that keys the sampled received signal.

11. The circuit arrangement of claim 9, wherein the time error measurement device comprises an early-late correlator.

12. The circuit arrangement of claim 9, wherein the evaluation device comprises a digital signal processor.

13. The circuit arrangement of claim 10, wherein the digital mobile radio receiver comprises a RAKE receiver.

14. The circuit arrangement of claim 13, wherein the RAKE receiver comprises a plurality of fingers, and wherein each RAKE finger in the RAKE receiver comprises a sampling phase selection element.

15. The method of claim 1, further comprising:
d) calibrating the discrete sampling control signal by allocating a predetermined value of the discrete sampling control signal to each quantization interval.

16. The circuit arrangement of claim 9, wherein the time shifts of the series of time shifts $\tau_i$ are predetermined time shifts.

17. A method for calibration of a discrete sampling control signal that influences a sampling time of a received signal in a mobile radio receiver, from a sampling phase selection element by definition of quantization intervals for a sampling time error signal, wherein each quantization interval is allocated a predetermined value of the discrete sampling control signal, comprising in the mobile radio receiver:
a) shifting a received signal in the signal path upstream of the sampling phase selection element through a series of time shifts $\tau_i$;
b) measuring values $e_i$, of the sampling time error signal that are associated with the respective time shifts $\tau_i$; and
c) determining the quantization intervals of the sampling time error signal from the relationship between the time shifts $\tau_i$ and the measured values $e_i$ obtained in act b), wherein determining the quantization intervals comprises:
c1) determining an optimum sampling time $\tau_{i\_opt}$ from the time shifts $\tau_i$; and
c2) determining the quantization intervals relating to discrete time shifts that are associated with the optimum sampling time $\tau_{i\_opt}$ and to which the sampling phase selection element is set by evaluating measured values $e_i$ between each of the time shifts.

18. The method of claim 17, wherein determining the optimum sampling time $\tau_{i\_opt}$ in c1) comprises:
determining a minimum value $e_{i\ min}$ of the measured values $e_i$; and
determining the optimum sampling time $\tau_{i\_opt}$ as a time shift $\tau_{i\ min}$ associated with the minimum value $e_{i\ min}$.

19. The method of claim 17, wherein determining the optimum sampling time $\tau_{i\_opt}$ in c1) comprises:
detecting at different time shifts $\tau_i$ a pilot signal contained in the received signal that is known at the receiver; and
determining the optimum sampling time $\tau_{i\_opt}$ as a time shift $\tau_{i\ max}$ at which the pilot signal is detected with a maximum magnitude.

20. The method of claim 17, wherein determining the quantization interval for the sampling time error signal in c2) comprises:
determining a mean value $\tau_{i\ mean\ k}$ between two predetermined time shifts; and
determining a first interval boundary, which governs the quantization interval, as the measured value $e_{i\ mean\ k}$ that is associated with the mean value $\tau_{i\ mean\ k}$, with a second interval boundary of the respective quantization interval coinciding with a first interval boundary of the adjacent quantization interval.

21. The method of claim 17, wherein the time shifts of the series of time shifts $\tau_i$ are predetermined time shifts.

22. A mobile radio receiver including a circuit arrangement for calibration of a discrete sampling control signal that influences a sampling time of a received signal in a mobile radio receiver, from a sampling phase selection element by definition of quantization intervals for a sampling time error signal, wherein each quantization interval is allocated a predetermined value of the discrete sampling control signal, comprising in the mobile radio receiver:
a time shifting element configured to shift a received signal in the signal path upstream of the sampling phase selection element through a series of time shifts $\tau_i$,
a time error measurement device configured to measure values $e_1$ of the sampling time error signal that are associated with the respective time shifts $\tau_i$; and
an evaluation device configured to determine the quantization intervals of the sampling time error signal from the relationship between the time shifts $\tau_i$ and the measured values $e_i$, obtained in act b), wherein determining the quantization intervals comprises:

c1) determining an optimum sampling time $\tau_{i\_opt}$ from the time shifts $\tau_i$; and c2) determining the quantization intervals relating to discrete time shifts that are associated with the optimum sampling time $\tau_{i\_opt}$ and to which the sampling phase selection element is set by evaluating measured values $e_i$ between each of the time shifts.

* * * * *